United States Patent [19]
vom Stein

[11] Patent Number: 5,209,342
[45] Date of Patent: May 11, 1993

[54] BELT DRIVE FOR A ROLLER CONVEYOR

[75] Inventor: Hans vom Stein, Wermelskirchen, Fed. Rep. of Germany

[73] Assignee: Interroll Holding AG, Switzerland

[21] Appl. No.: 858,227

[22] Filed: Mar. 26, 1992

[30] Foreign Application Priority Data

Apr. 5, 1991 [EP] European Pat. Off. ........ 91105374.2

[51] Int. Cl.$^5$ .............................................. B65G 13/07
[52] U.S. Cl. ................................... 198/790; 198/789
[58] Field of Search ...................... 198/781, 789, 790

[56] References Cited

U.S. PATENT DOCUMENTS

| | | | |
|---|---|---|---|
| 4,164,998 | 8/1979 | DeGood et al. | 198/790 X |
| 4,223,780 | 9/1980 | Saur | 198/789 X |
| 4,308,894 | 1/1982 | Ouellette | 198/790 |
| 4,361,225 | 11/1982 | Saur | 198/790 X |
| 4,479,572 | 10/1984 | Merz | 198/790 X |
| 4,753,339 | 6/1988 | Vogt et al. | 198/790 X |
| 5,040,669 | 8/1991 | Blöcker | 198/790 X |

FOREIGN PATENT DOCUMENTS

| | | | |
|---|---|---|---|
| 0005920 | 12/1979 | European Pat. Off. | 198/781 |
| 2550143 | 1/1976 | Fed. Rep. of Germany. | |
| 3308263 | 9/1984 | Fed. Rep. of Germany. | |
| 8303239 | 4/1985 | Netherlands | 198/790 |
| 8901915 | 2/1991 | Netherlands. | |
| 1413046 | 7/1988 | U.S.S.R. | 198/789 |

Primary Examiner—Robert P. Olszewski
Assistant Examiner—James R. Bidwell
Attorney, Agent, or Firm—Anthony J. Casella; Gerald E. Hespos

[57] ABSTRACT

A belt drive for a roller conveyor is provided to assure the firm application of the drive belt to the conveyor rollers regardless of manufacturing tolerances. Each pressing roller has a cylindrical base body as well as at least one belt-pressing disc adjoining it which extends annularly around the circumference of the cylindrical base body and obliquely to the axis of the pressing roller. The belt-pressing disc is arranged, as seen in the direction of the roller conveyor, in connection with the successive pressing rollers, alternately on the right and left of the pressing rollers. By the travel of the belt onto the obliquely developed belt-pressing disc the firm application of the drive belt against the conveyor rollers is assured.

14 Claims, 5 Drawing Sheets

BELT DRIVE FOR A ROLLER CONVEYOR

BACKGROUND OF THE INVENTION

A belt drive for a roller conveyor consists of pressing rollers for pressing a drive belt against the conveyor rollers of the roller conveyor in which the conveyor rollers as well as the pressing rollers are arranged on a profiled part which laterally adjoins the roll conveyor and the drive belt travels between the pressing rollers and the conveyor rollers.

The conveyor rollers of a roller conveyor are customarily driven by a sprocket wheel which is arranged on the conveyor rollers and a driven chain guided over it. Such a drive of the conveyor rollers is, to be sure, reliable but it nevertheless has certain disadvantages. Thus, in particular, this type of drive by chain is very noisy and furthermore expensive, since each conveyor roller must have such a sprocket wheel. Furthermore, in a chain drive for the conveyor rollers the weight of the roller conveyor is considerably increased by the chain and the sprocket wheels. Furthermore, the chain and the sprocket wheels must be regularly serviced in order to assure disturbance-free operation of the roller conveyor.

In order to avoid these disadvantages it is known to drive the conveyor rollers of a roller conveyor by a drive belt. For this purpose, pressing rollers are arranged below the conveyor rollers and press the drive belt against the conveyor roller. As means of suspension for the conveyor rollers and the pressing rollers there is used here the frame of the conveyor roller which limits it on the side. The known arrangement with pressing rollers, the drive belt which preferably consist of polyurethane, and the corresponding conveyor rollers is substantially quieter than a chain drive. Furthermore, due to the elimination of the sprocket wheels the conveyor rollers can be more simply shaped, which substantially reduces the cost of manufacturing the roller conveyor. In this type of drive, the drive belt is developed as an endless belt and is driven by a motor.

The profiled parts of the frame of the roller conveyor are prefabricated and are already provided with holes for the suspension or mounting of the conveyor rollers and drive rollers. The tolerance problems with regard to the profiled parts which are unavoidable in manufacture and, in particular, the position of the holes however make expensive adjustment devices necessary in order to provide assurance that the drive belt is pressed sufficiently firmly by the pressing roller against the conveyor roller to assure the drive of the conveyor roller. Such adjustment devices can, for instance, be slots rather than holes for receiving the pressing rollers. By means of the slots it is then possible properly to adjust the individual pressing rollers so as to compensate for the manufacturing tolerances. Since the roller conveyor, however, has a large number of pressing rollers even in the case of a relatively short conveyance path, the adjustment of the individual pressing rollers is extremely time-consuming and thus expensive. This is not changed if, instead of the pressing roller or in addition to it, the conveyor rollers can also be adjusted by a corresponding formation of slots.

OBJECT AND SUMMARY OF INVENTION

The object of the present invention is to propose a belt drive for a roller conveyor in which assurance is had, regardless of manufacturing tolerances, that the drive belt always presses sufficiently firmly against the conveyor rollers of the roller conveyor.

This object is achieved in a belt drive of the above indicated type in the manner that each pressing roller has a cylindrical base body as well as, adjoining it, at least one belt-pressing disc which extends annularly around the circumference of the cylindrical base body and obliquely to the axis of the pressing roller, the belt-pressing disc being arranged, seen in the direction of the roller conveyor, alternating on the right and left side of the successive pressing rollers.

While in the belt drive known up to now, the drive belt is guided in a circumferential groove in the pressing rollers, such guidance is not provided in the pressing roller of the invention. The drive belt, which is preferably of circular cross section, lies against the belt-pressing disc before the placing in operation of the belt drive, due to the alternate left and right arrangement of the belt-pressing disc against the successive pressing rollers. With the alternately right and left arrangement of the pressing rollers a left belt-pressing disc alternates, so to speak, from pressing roller to pressing roller with a right belt-pressing disc. The belt drive proposed will however function even if, in the case of two or more successive pressing rollers, the belt-pressing disc is arranged in each case on the same side before the alternation. The drive belt can, in this case, at the same time also rest on the cylindrical base body. Due to the belt-pressing disc which adjoins the cylindrical base body and its oblique development as well as the application of the drive belt against the belt-pressing disc, the drive belt, after the placing in operation of the belt drive, has a tendency to travel onto the obliquely directed belt-pressing disc in the direction towards the conveyor roller. By this known property of drive belts of travelling upwards on oblique surfaces, the problem, caused by the manufacturing tolerances, of the different distances between conveyor rollers and pressing rollers is solved, since the upward movement of the drive belt on the belt-pressing disc is limited by the arrangement of the conveyor rollers, and the drive belt thus rests in the desired firm manner against the conveyor rollers. In this connection, the distance between the end of the belt-pressing disc and the conveyor rollers should advantageously be less than the diameter of the drive belt since otherwise the drive belt could jump off from the pressing roller between the pressing roller and the conveyor roller. There is thus provided a belt drive which has the fundamentally desired quietness in operation and which permits the use of conveyor rollers of simple development, in which connection, however, despite the manufacturing tolerances present, the drive belt always has good friction and application against the conveyor roller.

Due to the left and right alternation of the belt-pressing disc, the drive belt can have a staggering motion which, to be sure, is limited as a function of the distance of the individual pressing rollers from each other and which has the positive effect that the drive belt is continuously maintained under tension and does not sag between the pressing rollers.

The belt-pressing disc represents a lateral limitation for the pressing roller in the form of an oblique plane. The belt-pressing disc can, in this connection, also be referred to as annular disc, obliquely extending flange, or pressing or run-on disc. By the proposed configuration of the pressing roller, there is made available, so to speak, a self-adjusting or self-regulating belt drive over an oblique plane. The tendency of the drive belt to run up on the belt-pressing disc can also be referred to as an after-running of the drive belt.

The belt-pressing disc is preferably arranged on, and in particular integral with, the cylindrical base body of the pressing roller. The cylindrical base body of the pressing roller and the belt-pressing disc can then be manufactured together and need not be produced separately and then mounted.

The belt-pressing surface of the belt-pressing disc is inclined at an angle of preferably 45° to the axis of the pressing roller. With this degree of inclination there is obtained optimal travel of the drive belt onto the belt-pressing surface of the belt-pressing disc. The belt-pressing disc and thus the belt-pressing surface represent a conical extension of the cylindrical base body. The height of the belt-pressing disc, as measured in a radial direction from the cylindrical base body, preferably corresponds to half the diameter of the drive belt. The width of the belt travel surface, i.e. the circumferential surface of the cylindrical base body, is preferably less than the diameter of the drive belt. By these preferred dimensions of base body and belt disc the entire pressing roller can be made correspondingly small and compact.

A guide disc, which extends substantially perpendicular to the axis of the pressing roller, is preferably also arranged on the free end of the belt-pressing disc. This guide disc can also be referred to as vertical flange and its purpose is to provide additional assurance that the drive belt does not jump off from the pressing rollers.

The belt application surface of the guide disc is advantageously slightly inclined to a radius of the axis of the pressing roller, in particular at an angle of 5°. By this slight inclination of the guide disc, assurance is had that the drive belt, insofar as it extends over the belt-pressing disc, contacts the guide disc as far as possible only at points and in particular remains on the pressing roller. It is sufficient here for the height of the guide disc to be less than the diameter of the belt, and it preferably amounts to half of the belt diameter.

In one particular embodiment, the pressing roller is mounted for rotation and longitudinal displacement on a bushing. By the proposed development of the pressing roller, easy travel of the pressing roller without frictional loss is assured and, in particular the possibility is afforded of changing the position of the pressing roller on the bushing.

The bushing is so developed that it can be placed on a pin, the one end of the pin being fixed in a lateral frame of the roller conveyor or in the corresponding profiled part of the frame of the roller conveyor and its other end bearing a nut in order to secure the bushing and the pressing roller. The proposed arrangement can make it possible for the bushing to move back and forth in the direction of its longitudinal axis on the pin, in which connection the amount of possible movement can be varied by a nut which can be screwed onto the other end of the pin.

Between the nut and the pressing roller, washers for changing the position of the pressing roller can be provided, their diameter corresponding at least to the diameter of the bushing. In this way, the possibility is afforded of changing the position of the individual pressing rollers with respect to the other pressing rollers by means of the washers so as to lift the drive belt further upward already in the position of rest, i.e. in the direction towards the conveyor rollers. Problems of tolerance can thus be easily compensated for and/or the drive belt can if necessary be brought into contact with the conveyor rollers already in the position of rest.

Furthermore, another device, arranged in particular on the bushing and intended to change the position of the pressing rollers, can be provided between bushing and pressing roller on the side facing the profiled part. In this way, the place where the pressing roller comes against the end of the bushing facing the profiled part can be varied. In order to secure the pressing roller, this end of the bushing may advantageously bear a sort of spur rim or collar so that the pressing roller can, in particular, not come against the profiled part.

In cooperation between the washers on the one hand and the further device on the other hand, the drive belt can be practically clamped between the pressing rollers so as to achieve a firm application of the drive belt against the belt-pressing discs and/or lift the drive belt upward in the direction of the conveyor rollers. The washers used to change the position of the pressing rollers or the said further device are preferably arranged in each case at the place of the pressing roller on which the belt-pressing disc is arranged. The desired effect is however obtained already if the position of the pressing rollers which have the belt-pressing disc on the side facing the nut is changed by the insertion of washers.

The distance between the conveyor rollers and the cylindrical base body of the pressing rollers can be greater than the diameter of the belt by the travel of the drive belt onto the belt-pressing disc. While in the present state of the art it had to be seen to it that the distance between conveyor roller and pressing roller correspond at least to the diameter of the drive belt, it is possible, by the configuration of the proposed pressing roller, also to provide a greater distance between conveyor roller and the cylindrical base body of the pressing roller.

The pressing rollers are preferably arranged between the individual conveyor rollers on the roller conveyor. It is accordingly not necessary for the axes of the pressing rollers and of the corresponding conveyor rollers to be arranged in a plane perpendicular to the plane of the roller conveyor. Rather, it is possible to arrange the pressing rollers at the distances apart resulting between the individual conveyor rollers, which results in particular in advantages in manufacture and maintenance.

In this connection the pressing rollers can preferably be arranged merely in every second space between the conveyor rollers. It is not necessary to arrange a pressing roller in each space, assurance being nevertheless had that the belt drive operates dependably, i.e. that the conveyor rollers are dependably driven by the drive belt. It is therefore possible for two conveyor rollers to be arranged between adjacent pressing rollers in the corresponding roller conveyor.

In the case of a curved course of the roller conveyor, the conveyor rollers, as is known, have a conically tapering cross section and, in accordance with the invention, are preferably attached via a conically widening intermediate piece to the frame or profile part arranged on the outside of the curved roller conveyor. It is self-evident that the pressing roller as well as the drive belt are arranged in this case on the outside of the curved roller conveyor. The conical configuration of the widening space makes it possible for the drive belt to apply itself in driving fashion against a region of the conveyor rollers without being pulled in this connection towards the center of the curved roller conveyor and thus losing the required tension of the drive belt.

The conically widening intermediate piece consists preferably of a cylindrical base body arranged adjacent to the frame of profile part and an adjoining belt-application flange which is inclined obliquely to the conveyor roller and extends annularly. The required tension in the drive belt is thus retained, since the drive belt rests on the one hand against the belt-pressing disc and on the other hand against the belt-application flange, which together so to speak form a wedge-shaped groove from which the drive belt cannot travel out towards the center of the roller conveyor. We thus have practically a two-roller belt guide.

BRIEF DESCRIPTION OF THE DRAWINGS

The present invention will be explained in further detail, by way of example, with reference to the following drawings, on basis of preferred embodiments. In the drawings.

DETAILED DESCRIPTION OF THE PREFERRED EMBODIMENTS

Figure 1:
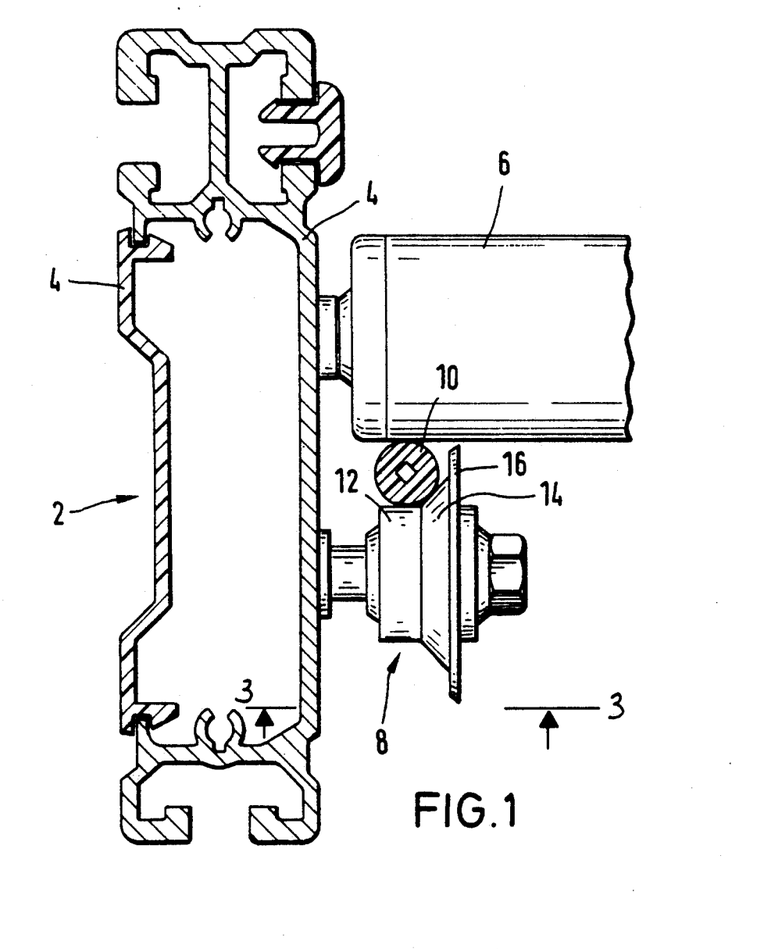
FIG. 1 is a cross section through the lateral closure of a roller conveyor with a view of the conveyor roller arranged thereon and of the drive roller with the drive belt between them.
Figure 3:
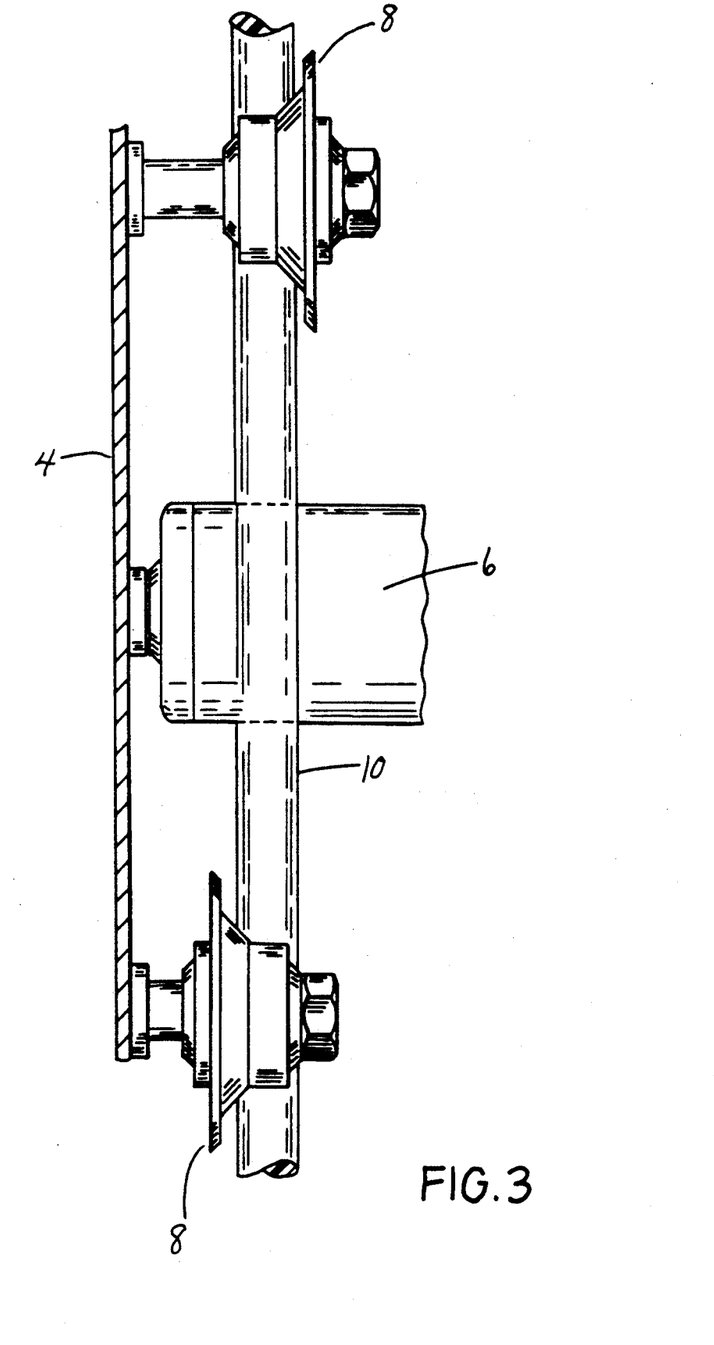
FIG. 3 is a cross-sectional view taken along line 3—3 in FIG. 1.

FIG. 1 shows, in cross section, the lateral limitation of a roller conveyor in the form of a frame 2. The frame 2 is formed of individual profile parts 4. A conveyor roller 6 and a pressing roller 8 lying below it are present on a frame 2. The conveyor roller 6 and the pressing roller 8 are mounted with their corresponding bearing pins in holes (not shown) in one of the profile parts 4. The profile parts 4 are prefabricated parts which have the corresponding holes already when delivered. Due to the unavoidable manufacturing tolerances, the predetermined distance between the center points of the mounting holes for the conveyor roller 6 and the pressing roller 8 can have considerable differences. In order nevertheless to assure the application against the conveyor roller 6 of the drive belt 10 of circular cross section which is arranged between the conveyor roller 6 and the pressing roller 8, the pressing roller 8 has a special configuration while the conveyor roller 6 in the manner customary in a belt drive of the roller conveyor is developed as a cylindrical body. The pressing roller 8 consists of a cylindrical base body 12, adjoining which there is a belt-pressing disc 14. Seen in the direction of the roller conveyor, the pressing rollers 8, which are arranged one behind the other, are provided alternating on each side, i.e. alternating on the left and right side, with the belt-pressing disc 14, as shown in FIG. 3. The belt drive, to be sure, is operative even if two or more successive pressing rollers 8 have the belt-pressing disc 14 arranged in each case on the same side before the change. Since the drive belt 10 has a tendency, upon the placing in operation of the belt drive, to travel upwards in the direction towards the conveyor roller 6 on the belt-pressing disc 14 which is arranged obliquely to the cylindrical base body 12, the desired firm application of the drive belt 10 against the conveyor roller 6 is assured. By the alternate arrangement of the belt-pressing disc 14 on the pressing rollers, a staggering movement of the drive belt 10 between the individual pressing rollers 8 can be produced which causes the continuous maintaining of the drive belt under tension and furthermore assists in the running of the drive belt 10 onto the belt-pressing surface 30.

An additional security against an undesired jumping off of the drive belt 10 from the pressing roller 8 beyond the top point of the belt-pressing disc 14, a guide disc 16 is arranged on the free end of the belt-pressing disc 14. This in particular also is the reason that the pressing roller 8 need not be arranged directly below the guide roller 6 but is preferably arranged in the spaces resulting between the individual conveyor rollers 6 so that the axes of the conveyor roller 6 and the pressing roller 8 do not lie in a plane which is perpendicular to the longitudinal direction of the roller conveyor.

Figure 2:
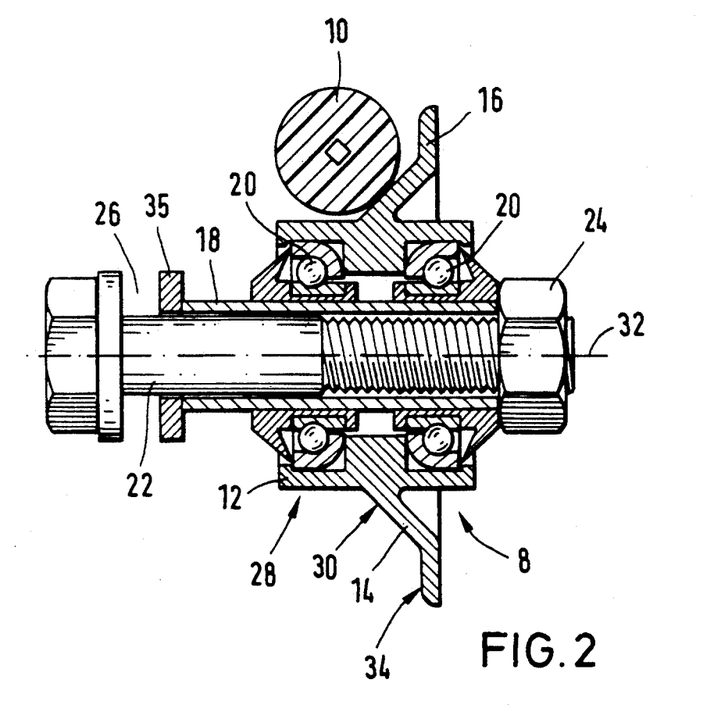
FIG. 2 is a cross section through the pressing roller of FIG. 1.

The particular configuration of the pressing roller 8 can be explained even better with reference to FIG. 2. FIG. 2 shows a cross section through the pressing roller 8 which is rotatably mounted on a bushing 18 via roller bearings 20. A showing of the conveyor roller and of the frame of the roller conveyor has been dispensed with in FIG. 2. The bushing 18 is placed on a pin 22 the one end of which is firmly mounted in the corresponding profiled part of the frame limiting the roller conveyor on the side. The profiled part not shown would be arranged at the place designated 26. In a preferred embodiment, the bushing 18 is arranged without clearance directly on the profiled part, it, however, also being possible to provide clearance between the bushing 18 and the profiled part. At the other end of the pin 22, there is a nut 24 which prevents the bushing 18 from sliding off from the pin 22 and the pressing roller 8 from the bushing 18 and may clamp the bushing 18 between the profiled part and the nut 24. It is self-evident that the pressing roller 8 is arranged for rotation and longitudinal displacement on the bushing 18. The pressing roller 8, which consists of the cylindrical base body 12 and the adjoining belt-pressing disc 14 which extends obliquely thereto, as well as the guide disc 16 which again adjoins same, can be relatively small and in particular developed in one piece. It is sufficient in this connection for the width of the belt travel surface 28 of the cylindrical base body 12 to be less than the diameter of the drive belt 10. The height of the belt-pressing disc 14, as seen from the cylindrical base body 12, is approximately only half as great as the diameter of the drive belt 10, as is also true of the height of the guide disc 16.

When the belt drive is at a standstill, the drive belt 10 rests against the belt-pressing surface 30 of the belt-pressing disc 14 and can lie on the belt travel surface 28 of the cylindrical base body 12. When the belt drive is in operation, the drive belt 10 will travel upwards on the belt-pressing surface 30 in the direction towards the conveyor rollers and thus contribute to assuring a desired firm application of the drive belt 10 against the conveyor rollers. The belt-pressing surface 30 is in this connection preferably inclined at an angle of 45° to the axis 32 of the pressing roller 8. The belt-application surface 34 of the guide disc 16 on the other hand is only slightly inclined to a radius through the axis 32 of the pressing roller 8, in particular at an angle of 5°. This slight inclination permits a merely pointwise application of the drive belt 10 against the belt-application surface 34 of the guide discs 16 in the event that the drive belt 10 has a tendency to leave the belt-application surface 30 of the belt-pressing disc 14 upwards or outward. The guide disc 16 sees to it that the drive belt 10 can in no case leave the pressing roller 8.

Figure 4:
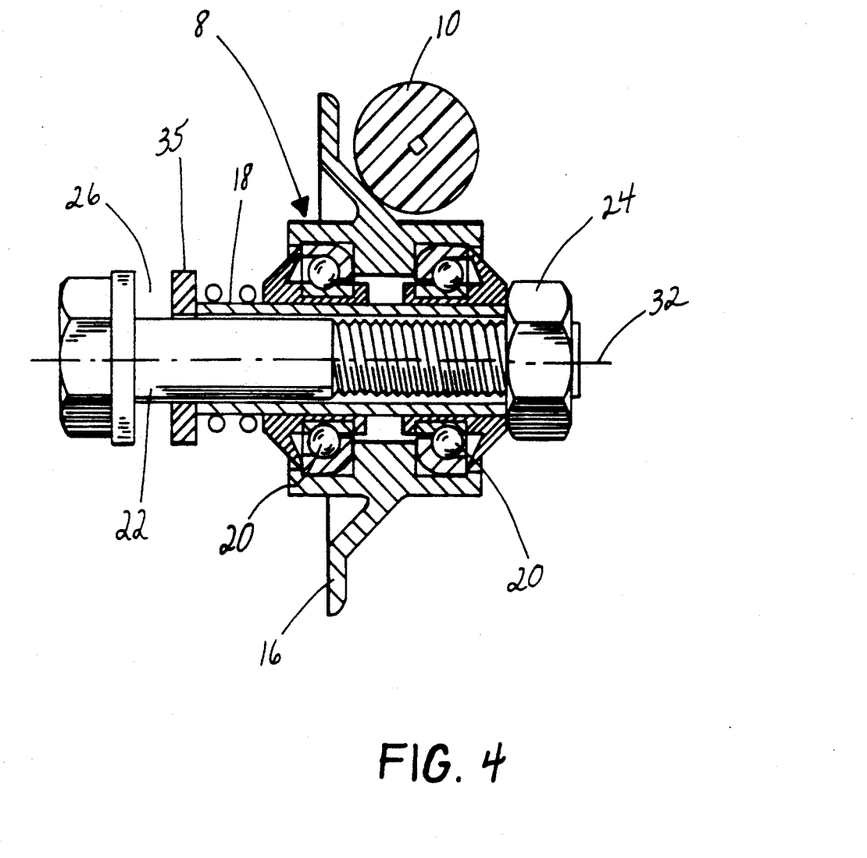
FIG. 4 is a cross-sectional view similar to FIG. 2, but showing a pressing roller urging a drive belt in an opposed direction.

In FIG. 2, the belt-pressing disc 14 is arranged to the right of the pressing roller 8. In order dependably to bring the drive belt 10 against the belt-pressing surface 30 of the belt-pressing disc 14 when the drive belt is already stopped, and/or to move the drive belt upward in the direction towards the conveyor roller 6, washers, the diameter of which corresponds at least to the outside diameter of the bushing, can be arranged between the nut 24 and the pressing roller 8 in order in this way to move the pressing roller 8 towards the profiled part or towards the drive belt 10. In this way, a wedge-shaped clamping of the drive belt 10 between the successive drive rollers 8 can be obtained since on the next or one of the next pressing rollers 8 the belt-pressing disc 14 is arranged to the left of the pressing roller 8. In order to reinforce the effect of the wedged-shaped clamping of the drive belt 10 between the pressing rollers 8, another device can be arranged between the flange or collar 35 and the pressing roll 8, particularly in the case of the belt-pressing disc 14 arranged on the left-hand side as shown in FIG. 4. This further device can in particular be arranged on the bushing 18 and see to it, upon corresponding use, that the pressing roller 8 is moved away from the frame of the roller conveyor in the direction towards the drive belt 10 so as, with the belt-pressing disc 14 arranged on the left, to move the drive belt 10 away from the frame of the roller conveyor so as to clamp it between the belt-pressing discs 14 arranged on the left and right hand sides. As a general rule, however, it will be sufficient to provide said washers in the case of the pressing rollers 8 with arrangement on the right of the belt-pressing disc 14 in order to achieve the desired movement towards each other of the pressing rollers 8 and the advantages obtained thereby.

The parts of a roller conveyor shown in FIGS. 1 and 2 are used obviously for roller conveyors which are linear or at most only slightly curved.

Figure 5:
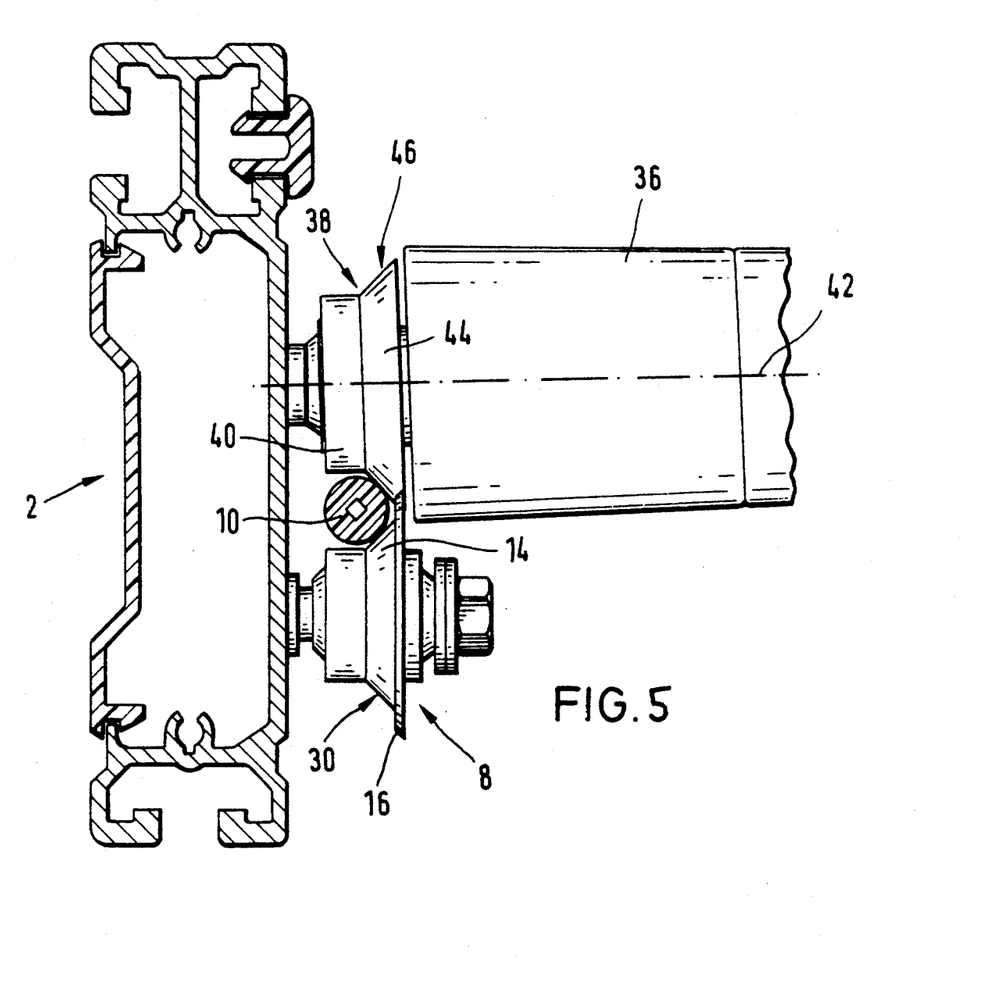
FIG. 5 is a showing similar to FIG. 1 with a curved course of a roller conveyor.

The development for a curved course of a roller conveyor is shown in FIG. 5, which, aside from the conveyor roller 36, agrees with the parts shown in FIG. 1. Accordingly, the same reference numerals are used for identical parts in FIGS. 1 and 5.

In known manner, with a curved course of a roller conveyor, the conveyor roller 36 is provided with a conically tapering cross section. The figure shows the outside of the curved roller conveyor on which the cross section of larger diameter of the conveyor roller 36 is arranged. On this outer side of the roller conveyor 36 there are also arranged the pressing roller 8 and the drive belt 10 of circular cross section present between the pressing roller 8 and the conveyor roller 36. While in FIG. 1 the drive belt 10 rests against the cylindrical circumference of the conveyor roller 6, in the showing of FIG. 5 the drive belt 10 rests against a conically widening intermediate piece 38. The intermediate piece 38 is arranged between the inside of the frame 2 and the actual start of the conveyor roller 36 and it consists of a cylindrical base body 40 arranged adjacent to the frame 2 and an adjoining annularly extending belt-application flange 44 which is inclined obliquely to the axis 42 of the conveyor roller 36 towards the latter. The belt-application flange 44 or the surface 46 thereof facing the drive belt is preferably inclined 45° to the axis 42 of the conveyor roller 36, in the direction towards the center point of the conveyor roller 36. The belt-application flange 44 is in this connection integral with the base body 40. The outer configurations of the intermediate piece 38 and the pressing roller 8 correspond approximately to each other, aside from the guide disc 16 which is additionally arranged on the pressing roller 8. The guide disc 16 can, however, be omitted at any time in the case of the pressing roller 8 without the functionality being impaired. However, it is advisable to use the pressing rollers 8 employed for the linear travel of roller conveyors also in the roller conveyor with curved course shown in FIG. 5. The application of the drive belt 10 against the surface 46 of the belt-application flange 44 as well as the belt-pressing surface 30 of the belt-pressing disc 14 results in a groove-like application of the drive belt 10, which prevents the drive belt 10 from jumping off the pressing roll 8 or the intermediate piece 38 in the direction towards the center of the conveyor roller 36. In this way, it is also possible to produce the necessary tension in the drive belt 10 within the curved course of the roller conveyor and maintain it. In this case also, the oblique development of the belt-pressing surface 30 of the belt-pressing disc 14 and of the surface 46 of the cylindrical base body 40 cause the travel of the drive belt 10 onto the surface 46 as well as the belt-pressing surface 30, as a result of which the firm application of the drive belt 10 against the intermediate piece 38 of the conveyor roller 36 is assured. Even with a curved course of the roller conveyor as shown in FIG. 5, the pressing rollers 8 are preferably arranged in the free spaces lying between the conveyor rollers 36, it not being necessary here either for a pressing roller 8 to be present in each space between the individual conveyor rollers 36.

I claim:

1. A belt drive for a roller conveyor, consisting of pressing rollers for pressing a drive belt against conveyor rollers of the roller conveyor, the conveyor rollers as well as the pressing rollers being arranged on a profile part which laterally delimits the roller conveyor and the drive belt extending between the pressing rollers and the conveyor rollers, characterized by the fact that each pressing roller (8) has a cylindrical base body (12) as well as at least one adjoining belt-pressing disc (14) which extends annularly around the circumference of the cylindrical base body (12) and obliquely to the axis (32) of the pressing roller (8), the belt-pressing disc (14), as seen in the direction of the roller conveyor, being arranged in connection with successive pressing rollers (8) alternately on the right side and the left side on the pressing rollers (8).

2. A belt drive according to claim 1, characterized by the fact that the belt-pressing disc (14) is arranged on and integral with the cylindrical base body (12) of the pressing roller (8).

3. A belt drive according to claim 1, characterized by the fact that a belt-pressing surface (30) of the belt-pressing disc (14) is inclined at an angle of preferably 45° to the longitudinal through the axis (32) of the pressing roller (8).

4. A belt drive according to claim 1, characterized by the fact that a guide disc (16) which extends substantially perpendicular to the axis (32) of the pressing roller (8) is arranged on a free end of the belt-pressing disc (14).

5. A belt drive according to claim 4, characterized by the fact that a belt-application surface (34) of the guide disc (16) is inclined to a radius through the axis (32) of the pressing roller (8) at an angle of approximately 5°.

6. A belt drive according to claim 1, characterized by the fact that the pressing roller (8) is mounted for rotation and longitudinal displacement on a bushing (18).

7. A belt drive according to claim 6, characterized by the fact that the bushing (18) can be placed on a pin (22) the one end of which is fixed in the profiled part (4) and which bears at its other end a nut (24) for securing the bushing (18) and the pressing roller (8).

8. A belt drive according to claim 6, characterized by the fact that washers are arranged between the nut (24) and the pressing roller (8) in order to change the position of the pressing roller (8), the diameter of said washers corresponding at least to the diameter of the bushing (18).

9. A belt drive according to claim 6, characterized by the fact that between the bushing (18) and pressing roller (8) on the side facing the profiled part (4) another device is arranged in order to change the position of the pressing roller (8).

10. A belt drive according to claim 1, characterized by the fact that the distance between the conveyor rollers (6) and the cylindrical base body (12) of the pressing rollers (8) is greater than the diameter of the drive belt (10).

11. A belt drive according to claim 1, characterized by the fact that the pressing rollers (8) are arranged between the individual conveyor rollers (6; 36) as seen in the longitudinal direction of the roller conveyor.

12. A belt drive according to claims 1, characterized by the fact that the pressing rollers (8) are arranged between adjacent conveyor rollers (6, 36).

13. A belt drive according to claim 1, characterized by the fact that, with a curved course of the roller conveyor, the conveyor roller (36) is connected via a conically widening intermediate piece (38) to the profiled part arranged on the outer side of the roller conveyor.

14. A belt drive according to claim 13, characterized by the fact that the conically widening intermediate piece (38) consists of a cylindrical base body (40) arranged adjacent to the profile part (4) and of an annularly extending belt-application flange (44) which adjoins it and is inclined obliquely to the axis (42) of the conveyor roller.

* * * * *